Nov. 7, 1961 J. H. HUMPHREY 3,007,761
ATTENDANCE RECORDING SYSTEM
Filed Aug. 26, 1957 7 Sheets-Sheet 1

JOHN H. HUMPHREY
INVENTOR.

BY
ATTORNEY.

Nov. 7, 1961 J. H. HUMPHREY 3,007,761
ATTENDANCE RECORDING SYSTEM
Filed Aug. 26, 1957 7 Sheets-Sheet 2
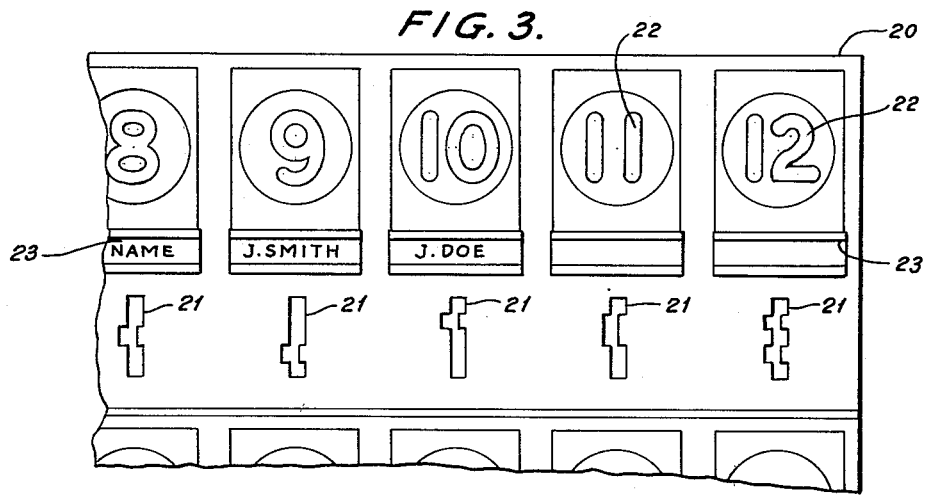
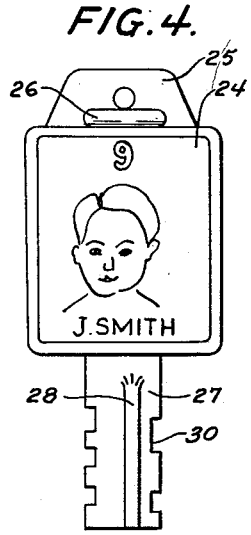
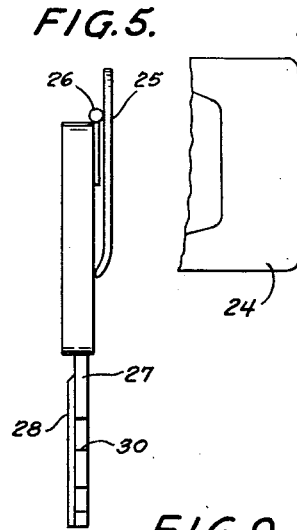
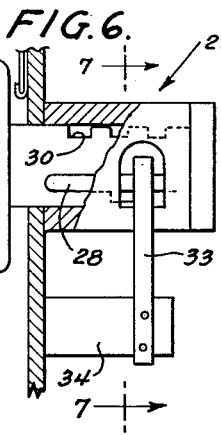
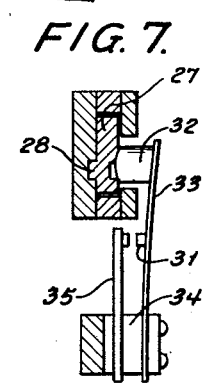
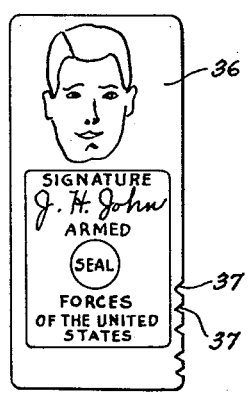
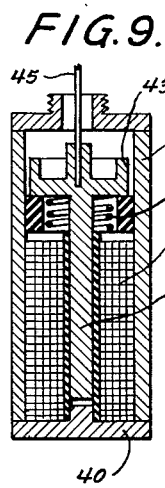
JOHN H. HUMPHREY
INVENTOR.
BY
ATTORNEY.

JOHN H. HUMPHREY
INVENTOR.

BY

ATTORNEY.

Nov. 7, 1961 J. H. HUMPHREY 3,007,761
ATTENDANCE RECORDING SYSTEM
Filed Aug. 26, 1957 7 Sheets-Sheet 4

JOHN H. HUMPHREY
INVENTOR.
BY
ATTORNEY.

Nov. 7, 1961 J. H. HUMPHREY 3,007,761
ATTENDANCE RECORDING SYSTEM
Filed Aug. 26, 1957 7 Sheets-Sheet 5

JOHN H. HUMPHREY
INVENTOR.

BY
ATTORNEY.

Nov. 7, 1961

J. H. HUMPHREY 3,007,761

ATTENDANCE RECORDING SYSTEM

Filed Aug. 26, 1957

JOHN H. HUMPHREY
INVENTOR.

BY

ATTORNEY.

Nov. 7, 1961   J. H. HUMPHREY   3,007,761
ATTENDANCE RECORDING SYSTEM
Filed Aug. 26, 1957   7 Sheets-Sheet 7

JOHN H. HUMPHREY
INVENTOR.

BY
ATTORNEY.

United States Patent Office 3,007,761
Patented Nov. 7, 1961

3,007,761
ATTENDANCE RECORDING SYSTEM
John H. Humphrey, Port Washington, N.Y.
(7521 Piper Place, Los Angeles 45, Calif.)
Filed Aug. 26, 1957, Ser. No. 680,114
2 Claims. (Cl. 346—55)

This invention relates to an attendance recorder which records the presence of workmen in a factory or other place of business. It has particular reference to a machine which requires no supervision, is capable of multiple recordings simultaneously, and employs components which may be used to advantage in other business and recording systems.

The most generally used system of recording attendance in modern factories is the clock card which must be inserted into a time clock in order to have a date and time indicated thereon. Since only one card can be inserted into a clock at a time, long lines of workmen are apt to be formed both when punching in and out. These waiting lines often mean that a workman is recorded late when he arrived on time, and this system tends to form waiting lines at or before closing time and therefore detracts from the time spent at work.

The present invention requires no further operation other than the lifting of an identification tag from a rack and entering the work area. The identification tag can be worn during the work period. Many workers can pick up their tags at the same time therefore there is no waiting line. On leaving the work area the workmen insert their tags into the proper receptacles and leave the building. There is no delay and many workmen can leave the work area at the same time without any hindrance. In order to eliminate errors, the identification tag may contain cutout portions which permit its insertion into a selected compartment. The identification tag may also contain additional cutout portions which may be used by the workmen while at work in assisting accumulation of data for job cost accounting and in the maintenance of proper inventory stocks. The present invention, however, is directed only toward the recording of attendance and pay roll accounting.

One of the objects of this invention is to provide an improved attendance recorder which avoids one or more of the disadvantages and limitations of prior art arrangements.

Another object of the invention is to record the entrance and exit times of workmen or other personnel simultaneously without requiring the workmen to stand in line.

Another object of the invention is to record the attendance of the workmen without the necessity of inserting a card in the slot of a time clock.

Another object of the invention is to eliminate individual time cards and record the attendance data for a large number of workmen on a single record sheet.

Another object of the invention is to employ an identification tag as a time recording means as well as an identification means during working hours.

Another object of the invention is to eliminate errors in selecting the proper tag when entering a work area.

Another object of the invention is to eliminate errors when the workmen leave a work area by providing selection means which insure the insertion of a tag into the proper receptacle.

Another object of the invention is to reduce the cost of payroll accounting systems and to increase the speed of payroll accounting methods.

Another object of the invention is to provide an automatic attendance record keeping system which utilizes the same metal plates as a translating and recording system it supplements.

Another object of the invention is to decrease the indignities accompanying a "clock punching" requirement while still providing minimum essential records for business and governmental requirements.

The invention comprises a rack for holding a plurality of identification tags. Each compartment which holds a single tag includes an electrical contact means which is wired to a central recorder, the electrical contacts permitting the passage of current to denote the absence of a tag. The central recorder includes a system of printing on a record sheet to denote the absence or presence of a tag in the rack. The recording means includes a record sheet with time designations printed thereon to assist in identifying the time duration of a workman in the work area.

One feature of the invention includes a method of printing a plurality of dots on the record sheet by means of a system of solenoids energized by electrical power.

Another feature of the invention includes a printing means for printing dots on the record sheet by means of mechanical hammers set by a bail and controlled to print by electromagnetic control means.

Another feature of the invention includes a multiple drum recording means for recording the attendance record of a large number of workmen. The drums are shifted into and out of a printing position by mechanical means controlled by an electric circuit.

For a better understand of the present invention, together with other and further objects thereof, reference is made to the following description taken in connection with the accompanying drawings.

FIG. 3 is a detailed front view of a portion of the rack shown in FIG. 1 showing the slot for inserting the tags and other details for identification.

FIG. 4 is a plan view of an identification tag.

FIG. 5 is a side view of the tag shown in FIG. 4.

FIG. 6 is a detailed drawing, with parts in cross section, of a portion of the tag inserted into a slot in the rack.

FIG. 7 is a cross sectional view of the slot and tag shown in FIG. 6 and is taken along line 7—7 of that figure.

FIG. 8 is an alternate form of tag similar to FIG. 4 but containing identifying cutout portions on one edge thereof.

FIG. 9 is a cross sectional view of a solenoid which can be used to actuate the printing hammers which print the dots on the attendance record.

FIG. 10 is a sectional view of a drum and a printing hammer operated by a solenoid which is coupled to the hammer by a Bowden wire.

Referring now to FIGS. 1 to 10, inclusive, the invention comprises a rack 20 which includes a plurality of slots 21 for the insertion of the identifying tags, an identifying number 22, and a retaining means 23 for holding a paper which includes the name of the workman.

Figure 1:
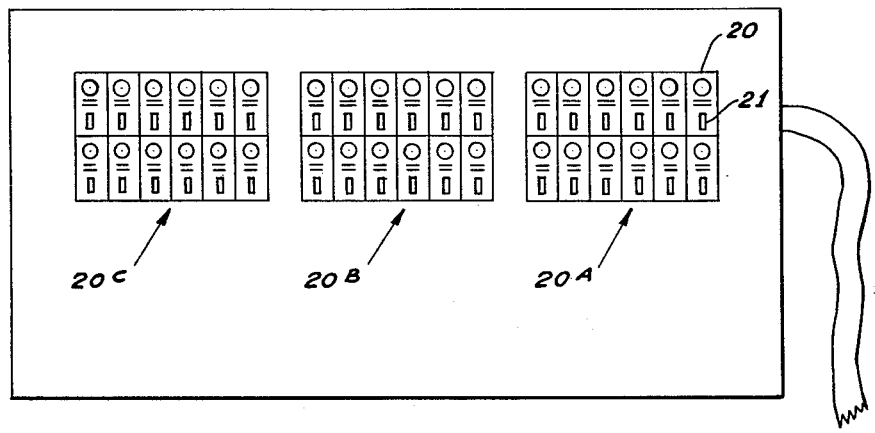
FIG. 1 is a plan view of a rack for holding identification tags.

The workman's number is placed on the rack for easy identification and may be back-lighted to assist the workman in finding the proper rack quickly. It will be noted that each of the slots 21 shown in FIG. 3 is formed with different configurations so that only one identifying tag may be placed in each slot. The identification tag shown in FIG. 4 comprises a flat frame portion 24 which may be used to hold the picture and the name of the workman although all these identifying means are not necessary for the successful operation of the attendance recorder. In order to attach the tag to a portion of the workman's clothing a spring clip 25 secured by a hinge 26 is attached to the back of the tag so that the tag may be worn secured to a pocket flap or on a belt. Directly below the picture frame 24 is a metallic extension 27 which includes splines 28 and cutout portions 30. The splines 28 are formed in extension 27 in order to fit into slots 21, these splines are for the purpose of insuring that the workman cannot make a mistake and insert his tag into some other workman's slot. The combination of splines and slots are not too numerous so that in any one area such as indicated in FIG. 1 as 20A the splined slots may all be different, but this combination of slots may be repeated at 20B and 20C, thereby reducing the number of combinations needed to counteract errors which otherwise might be committed by inserting an identification tag in a slot to the right, to the left, or in the immediate vicinity of the correct slot.

The cutout portions 30 are not necessary for the operation of the mechanisms shown in the present drawings but are supplementary to the operation of the identification tags and are used in other machines to accomplish other purposes. It will be evident from FIGS. 6 and 7 that the cutout portion 30 play no part in the recording means which shows attendance records only.

FIG. 6 shows the identification key 24 inserted into one of the slots 21 which is designed to receive the key portion of the identification tag and operate a pair of electrical contacts 31 associated therewith.

When the key is placed into the slot it makes contact with an insulator 32 which is secured to a flexible conductor 33. Conductor 33 is mounted on an insulating base 34 which also holds a cooperating contact 35. When the identification tag is not in the slot, contacts 31 are closed and by this means send a current through conductors 33—35 to the recording mechanism which will be described later.

The identification tag shown in FIG. 8 is easier to manufacture, costs less to produce, and in some ways produces the same results as the tag shown in FIGS. 4 and 5. This identification tag 36 contains the picture of the workman and other essential data necessary to admit him to the plant. It also contains cutout slots 37 on one side of the tag, these cutout portions being for use in a machine not indicated in these drawings. The use of tag 36, however, is similar to the use of the tag shown in FIGS. 4 and 5. Tag 36 is inserted into a rack similar to that shown in FIGS. 6 and 7 and thereby opens contacts 31.

FIG. 9 shows a solenoid which has been used for many years in various computing machines. It comprises a soft iron cylindrical jacket 38, a similar end piece 40, an electrical winding 41, and a plunger 42 which is retracted as shown in the drawing to effect a printing operation. The plunger 42 also includes a disk portion 43, the periphery of which is mounted adjacent to the shell 38 in order to reduce the magnetic reluctance during the operation. The return force is provided by a helical spring 44. A Bowden wire 45 is secured to the central portion of plunger 42 and is enclosed in the usual casing 46 (see FIG. 10) between the solenoid and a pivoted hammer 47. The hammer 47 is shown in FIG. 10 in dotted lines in its unactuated position and in full lines in its actuated or printing position. Hammer 47 is pivoted on a shaft 48 which extends for the entire width of the machine and supports all of the hammers which operate to produce printing dots on a single record sheet. A portion of the drum 50 (see FIG. 2) is shown in FIG. 10 and supports the record sheet 51 (shown in detail in FIG. 12). A ribbon 52 is mounted adjacent to the paper surface and extends for the entire length of the drum.

Figure 2:
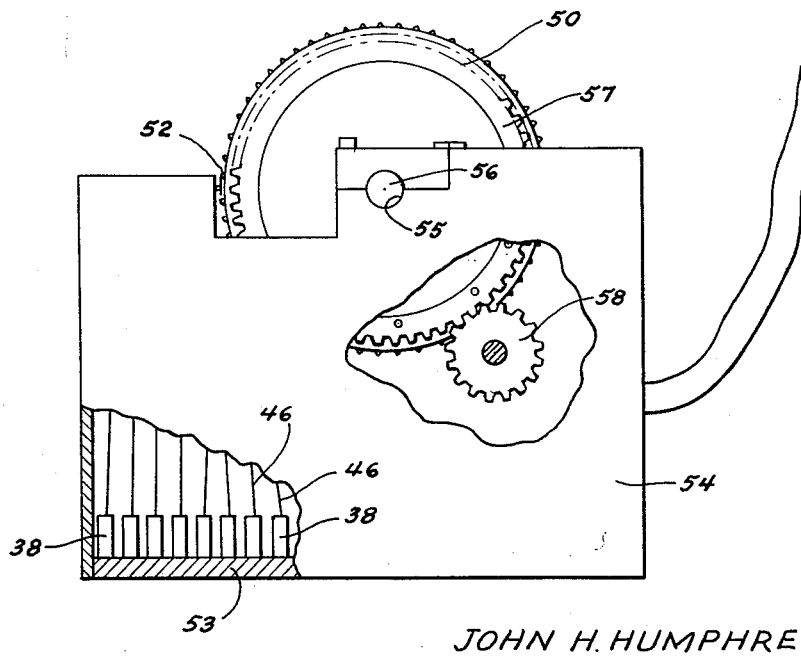
FIG. 2 is a side view, with certain parts of the case cut away to show the internal structure, of a single drum recording structure.

FIG. 2 shows a simplified one-drum recording mechanism having a base 53, side plates 54, and journal means 55 for supporting a shaft 56 to which is secured the drum 50. The drum is rotated by means of a gear 57 and a pinion 58 which is secured to a motor (not shown) which rotates during the working hours when the machine is recording and is adjusted to turn the drum 50 at a speed which is proportional to the elapsed time. In the base of the machine are a plurality of solenoids 38 similar to that shown in FIG. 9, these solenoids having their casings coupled to Bowden wire casings 46 and their plunger 42 coupled to Bowden wires 45. In this type of machine each printing position which corresponds to an employee is aligned with a hammer 47 and each hammer is operated by a solenoid 38.

In FIG. 1 thirty-six slots are shown, each having a pair of contacts 31 as shown in FIG. 7. The easiest way to connect these contacts with solenoids 38 shown in FIG. 2 is to run thirty-seven wires between the rack and the recording machine, one common wire and one wire for each of the thirty-six contacts. In order to eliminate high currents and to lower excessive mechanical strain on the surface of the drum 50, it has been found advisable to operate the hammers 47 in sequence instead of simultaneously. For this purpose a rotary commutating switch 60 may be used (see FIG. 14). This switch includes a rotary arm 61 secured to a shaft 62 and a plurality of spaced contacts 63 arranged in a circle for contact by the end of arm 61. For the simplified machine shown in FIG. 2 and the thirty-six contacts associated with the slots shown in FIG. 1, the switch 60 must be provided with thirty-six contacts 63 and a single arm 61. Shaft 62 may be coupled to a one-revolution clutch which is controlled to operate at convenient time intervals, such as every six minutes. Arm 61 is connected to a source of potential 64 and conductor 65 which is the common conductor for all the contacts.

Figure 11:
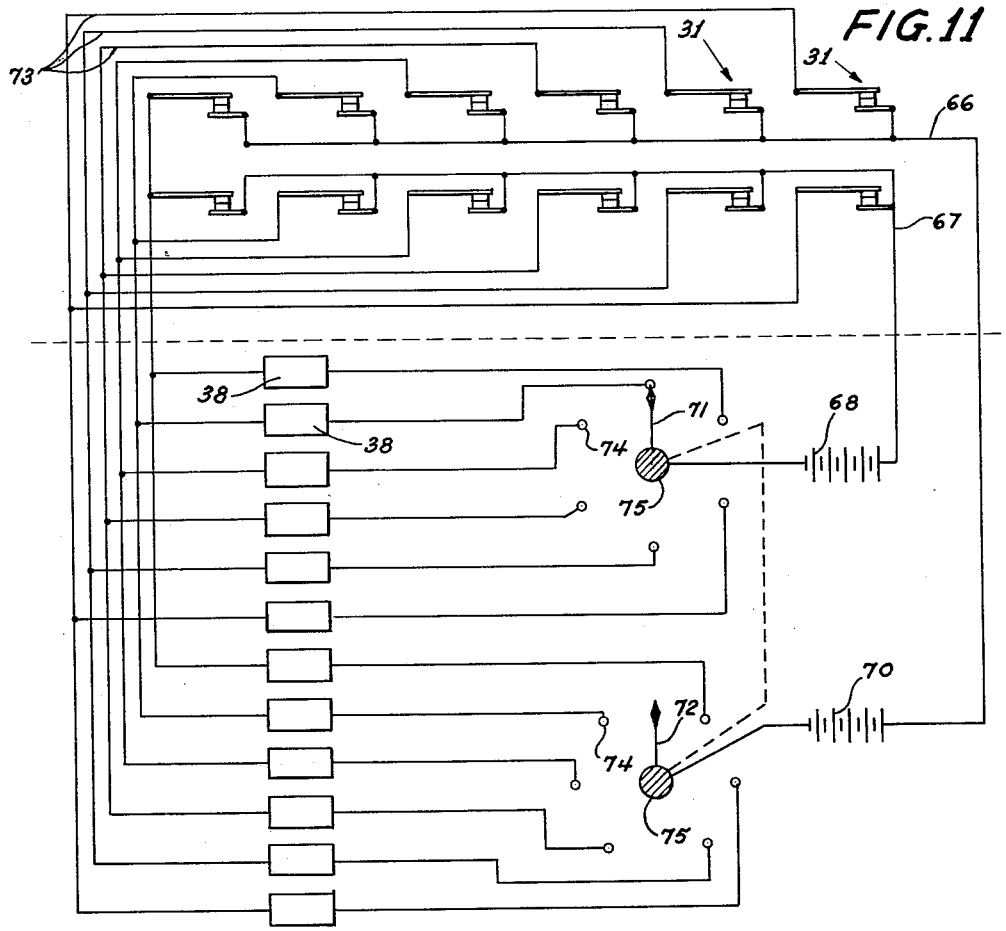
FIG. 11 is a schematic diagram of connections showing how the contacts in the rack may be connected to a plurality of solenoids and a double system of commutators to fire the solenoid when a recording operation is being made.

If the racks which hold the identification tags 24 are at a considerable distance from the recording machine shown in FIG. 2, a saving may be effected by eliminating a number of wires which connect the two installations. Such a scheme is shown in schematic form in FIG. 11 where the number of contacts has been reduced to twelve for the sake of clearness. It is probable that this multiple contact system of wiring will be used only if the total number of solenoids and hammers is 50 or over. In FIG. 11 the twelve contacts are divided into two groups each group having common conductors 66 and 67. These conductors run to two batteries 68 and 70 or other sources of potential and are connected to separate rotating contact arms 71 and 72.

Each of the six contacts 31 in one group is connected to a separate wire 73 which runs to the recording mechanism. In a similar fashion each of the six contacts in the second group is connected to one of the same wires so that each of the conductors 73 is connected to two contacts in the storage rack 20. In the base of the machine are twelve solenoids 38, one end of their windings being connected in pairs to conductors 73 while the other end of each winding is connected to a contact 74 in one of the rotary switches. The contact arms 71 and 72 are connected to the same shaft 75 or to two similar shafts which are coupled to each other to rotate in unison. Shaft 75 may also be rotated by a one-revolution clutch which is controlled to turn once every six minutes. It will be noted that contacts 74 in one group are staggered relative to the contacts in the other group so that the contact arms 71, 72, alternate in making conductive contact to send current through solenoids 38 and operate them in sequence as described above.

Figure 12:
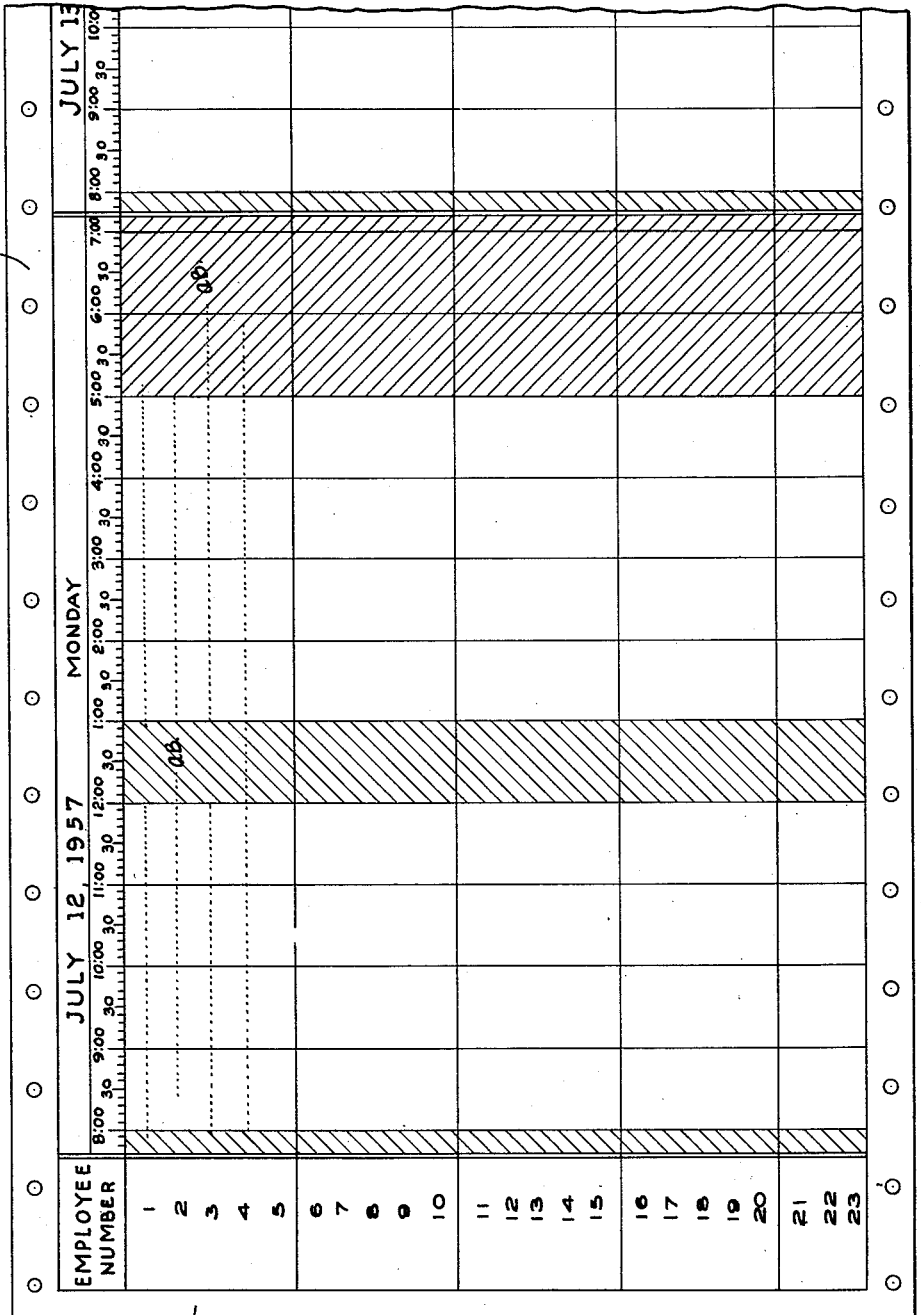
FIG. 12 is a plan view of the record secured to a recording drum and indicates how the recordings are made on a record which is calibrated with time designations.

One form of record 51 is shown in detail in FIG. 12. The record is generally designed to cover a complete week of seven days, each day being divided into hours and six-minute time intervals and includes time designations from several minutes before the work day starts to about two hours after the close of the normal workday period. The first entry on the record, employee No. 1, indicates the normal record which will be printed for the majority of the workers. In this case the workman withdrew his identification tag from the rack prior to six minutes before 8:00 and remained at work up to and including 12:00. He then left work and inserted his identification tag into the rack before six minutes after 12:00 and went to lunch. After lunch he returned prior to six minutes before 1:00 and remained at work until after 5:00, depositing his identification tag into the rack sometime after 5:06. This record indicates the normal attendance record and will be credited by the accounting department as a full day's pay.

The record shows that employee No. 2 arrived at work late and the first indication of his presence is a mark indicating that he withdrew his identification tag prior to 8:24. This employee remained at work until 12:24 to make up for the time lost by his late arrival. Employees' records which show work done during the lunch hour are not credited against their weekly pay account unless the supervisor's initials are on the record. In this case the supervisor did put his initials on the record indicating that the work during the lunch hour was to be applied to the time lost by the late arrival.

The record of employee No. 3 shows a normal morning attendance and an afternoon attendance which is normal except for the fact that he worked overtime beyond the 5:00 closing hour until 6:06. This employee is entitled to overtime pay because the foreman has signed his initials on the record thereby indicating a desire to retain this man at work at the usual closing hour. The record of employee No. 4 shows that he arrived prior to 8:00, stayed within the work area during the lunch hour and left the work area some time after 5:42. This workman is not entitled to any overtime pay since his supervisor has not signed the record.

Figure 13:
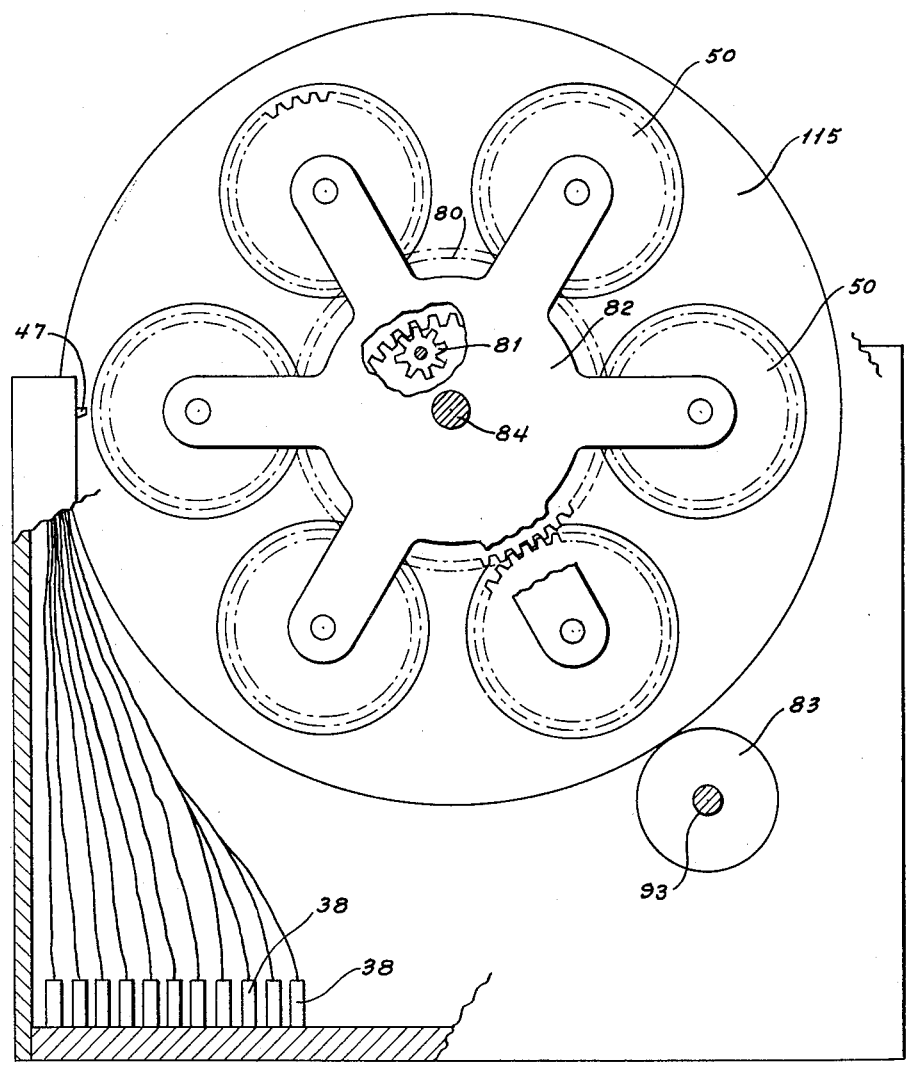
FIG. 13 is a side view, with some parts in section, of a multiple drum recording mechanism.

FIG. 13 shows a recording device which contains six drums with a mechanism for shifting from one drum to another. Each drum is turned on its axis by a gear 80 which in turn is rotated by a pinion 81 turned by a clock motor. The six drums 50 are each journalled in an extension of a spider plate 82 which is rotated by a pinion gear 83. This recording mechanism is obviously adapted for installations which record the attendance record of a large number of workmen. It has been found that the records of one hundred workmen may be tabulated by a single drum but if the number of workmen exceed five hundred and are not more than six hundred a six drum recording mechanism is necessary. For this installation one hundred solenoids 38 are required and a single-revolution clutch is employed by means of a 6 to 1 gear reduction to shift the spider 82 from one drum printing position to another. The motor secured to pinion 81 shifts the drum an amount equivalent to one-sixth of a revolution of central shaft 84 and thereby positions another drum in the printing position.

If there are one hundred employee numbers on each of the drums 50 then one hundred solenoids are necessary to record the time records of the employees whose numbers correspond to the numbers on the drum. As each drum is turned into its printing position the solenoids are actuated and the printing hammers 47 are operated to indicate the absence of an identification tag from the rack. As soon as the records for one drum are printed on the record, gear 83 positions another drum and a similar record is made for that drum. In this manner a single recording device such as shown in FIG. 13 may be used to record the attendance of six hundred employees.

Figure 14:
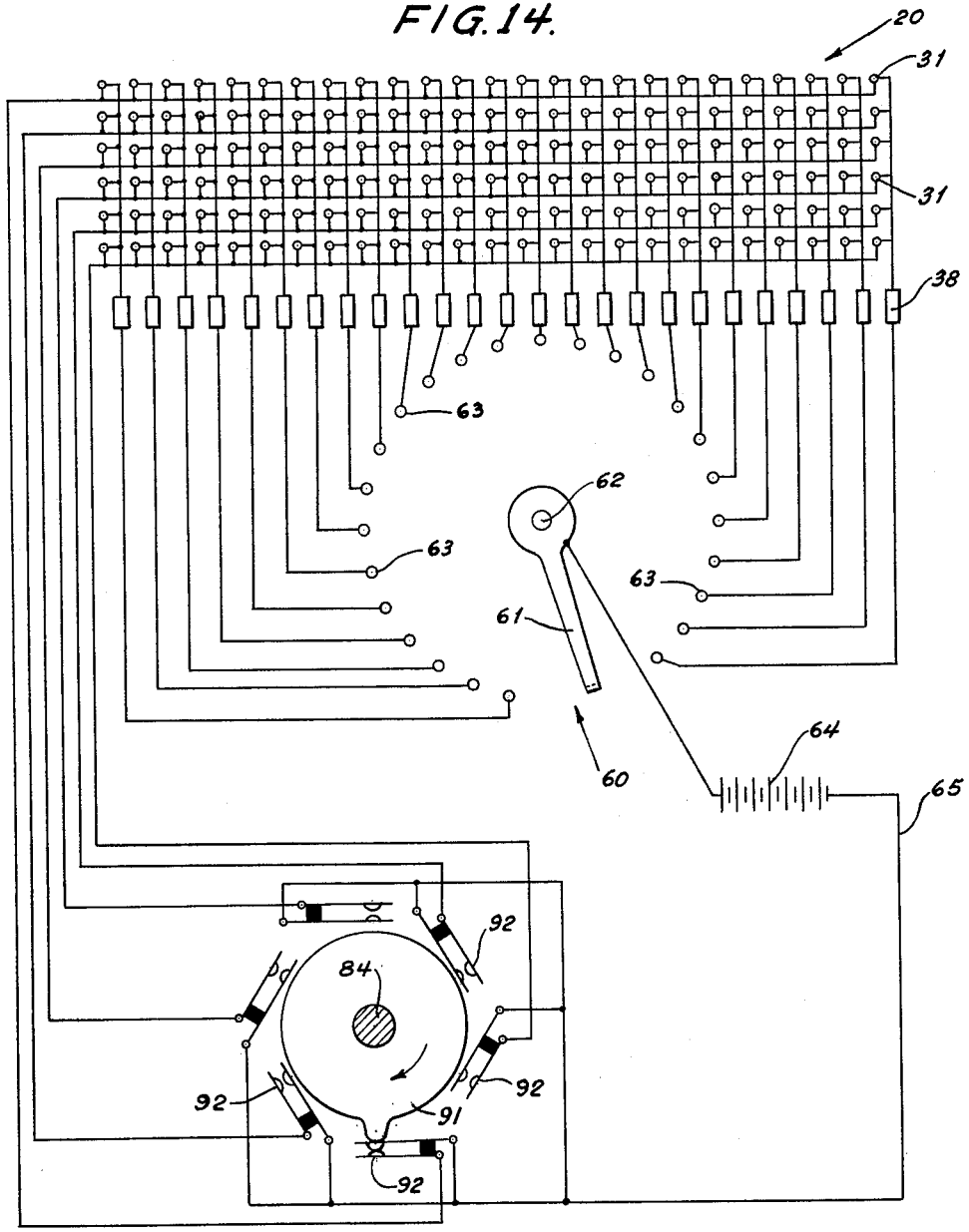
FIG. 14 is a schematic diagram of connections indicating the wiring arrangements for a recording mechanism containing six drums and twenty-five worker numbers for each drum.

The wiring diagram shown in FIG. 14 is a diagram for six drums with twenty-five recording positions on each drum, the reduction from one hundred to twenty-five being made for the purpose of simplification and clarity. It will be noted that there are two revolving shafts, one shaft 62 being operated by a one-revolution clutch and designed to make conductive contact with twenty-five contacts 63, each of which is connected to a solenoid 38. A second shaft 84 is turned when the spider 82 is turned. As indicated above, this shaft may be turned by a one-revolution clutch 95 (FIG. 15) which is coupled to shaft 84 by a six-to-one gear coupling.

As shaft 84 is rotated, a cam 91 makes contact with one of a series of six contacts 92 around its periphery and activates a group of twenty-five solenoids which may or may not be actuated when arm 61 is rotated. The actuation of the solenoids depends upon whether or not contacts 31 in rack 29 are closed or open. It will be evident from the schematic diagram shown in FIG. 14 that the topmost row of contacts will furnish the current to solenoids 38 when arm 61 is first rotated. After the first rotation, shaft 84 is turned one-sixth of a revolution to close the next pair of contacts 92, and when arm 61 makes its second revolution the second row of contacts 31 determine whether or not solenoids 38 will be actuated.

Figure 15:
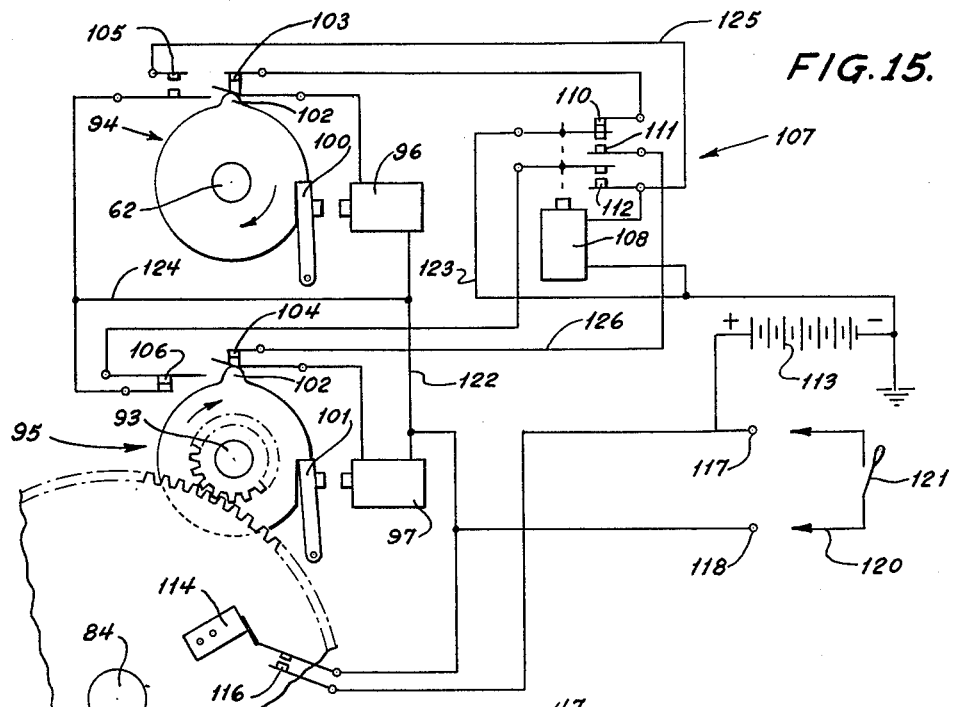
FIG. 15 is a schematic diagram of connections of the control mechanism which operates the multiple recorder shown in FIG. 13.

The diagram of connections shown in FIG. 15 illustrates one control system for turning shaft 62 which rotates arm 61. This control also turns a shaft 93 which is coupled to shaft 84 and turns it one-sixth of a revolution for each actuation. The control system includes two one-revolution clutches 94 and 95 which are actuated by trip coils 96 and 97. When current passes through either of these coils the associated stop 100—101 is drawn toward the coil core and other clutch mechanisms are engaged to turn the clutch one revolution and then stop. One-revolution clutches are well-known in the art and need not be described in detail here. Associated with each clutch is a cam knob 102 which engages a pair of contacts 103—104 and holds them in a closed position when the clutches are at rest. Also associated with clutch 94 is a normally open pair of contacts 105 which is closed by the rotation of the clutch just before the end of its revolution. A similar pair of contacts 106 is mounted adjacent to clutch 95 but this pair of contacts is normally closed and is opened near the end of the rotation of clutch 95.

The clutch control system also includes a control relay 107 having a winding 108 and three pairs of contacts 110, 111, and 112. A battery 113 or other source of potential supplies the circuit with electrical power. In order to stop the sequence of events a cam lug 114 is secured to gear 115 and is positioned so that it opens a pair of contacts 116 in its normal rest position. A pair of terminals 117, 118, are connected to the circuit and are for connection to conductors 120 which run to a switch 121 in a time clock mechanism. Switch 121 is closed every six minutes and remains closed for a time interval which is longer than two seconds but less than twelve seconds.

The operation of this circuit is as follows: In its normal or rest position switch 121 is open, the clutches are at rest and cam lug 114 holds contacts 116 in their open position. No current flows in this circuit. Now let it be assumed that switch 121 is closed by the time clock mechanism. A current will then flow from the positive terminal of the source of potential 113 through switch 121, over conductor 122, through winding 96, through contacts 103 and 110, and back to the negative of battery 113 over conductor 123. The current through this circuit actuates stop bar 100 and clutch 94 starts to rotate. The speed of rotation is designed to be about one revolution per second and as soon as the rotation starts, contacts 103 are opened and stop bar 100 is released, falling back toward its stop position to engage the cutout portion in the clutch and stop it at its zero position. Just before the completion of the single revolution, cam 102 closes contacts 105 and completes a circuit which may be traced from the positive terminal of battery 113, through contacts 121, over conductors 122 and 124, through contacts 105, over conductor 125, through winding 108, and back to the negative terminal of battery 113. This circuit causes the actuation of relay 107 and breaks contacts 110, closing contacts 111 and 112. When contacts 112 are closed, a holding circuit is completed which may be traced from the positive terminal of battery 13, through contacts 121, over conductors 122 and 124, through contacts 106, through contacts 112, the winding 108, and back to the negative terminal of battery 113. This holding circuit retains relay 107 in its actuated position until contacts 106 are opened.

When relay 107 is actuated, another circuit is completed which may be traced from the positive terminal of battery 113, through contacts 121, through winding 97, contacts 104, conductor 126, contacts 111, conductor 123, and back to the negative terminal of battery 113. This circuit actuates stop bar 101 and causes one-revolution clutch 95 to turn one revolution, thereby advancing gear 115 for one-sixth of a revolution, breaking contacts 104 and releasing bar 101 in a manner similar to the operation of clutch 94. Near the end of the single revolution of clutch 95 the cam lug 102 breaks contacts 106, thereby breaking the holding circuit of relay 107 and returning it to its normal condition. As soon as the relay 107 is in its unactuated condition, one-revolution clutch 94 is again actuated by means of the same operating circuit as described above and as soon as clutch 94 has completed its sequence of operations, relay 107 is again actuated and clutch 95 is again started for another revolution. From the above description it will be obvious that clutches 94 and 95 alternate in operation, each making six single revolutions. After the first revolution of clutch 95, lug 114 moves away from contacts 116 and they will close. When this happens, switch 121 may be opened and the current from battery 113 which flowed through 121 now flows through 116. At the end of the sixth revolution clutch 95 turns gear 115 to a position where cam lug 114 opens contacts 116. At this time all operation ceases because no further circuit can be completed from the positive terminal of battery 113. Both clutches 94 and 95 remain inoperative until six minutes later when switch 121 in the timing mechanism is again actuated and the entire operation is again repeated.

Figure 16:
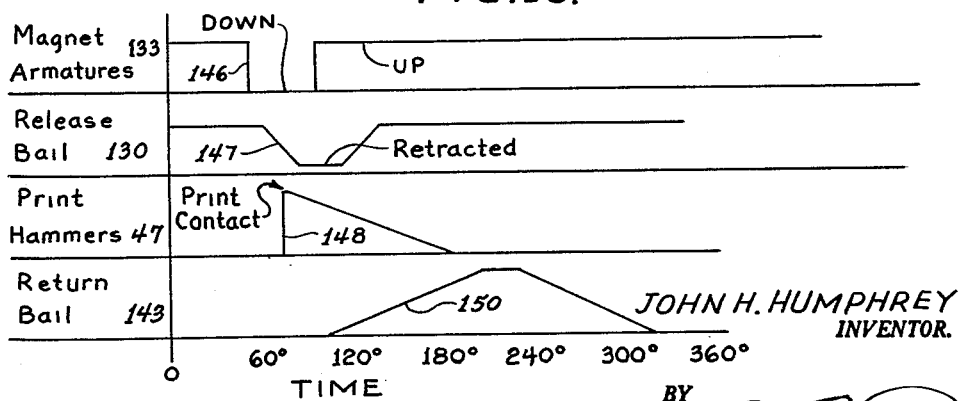
FIG. 16 is a graph which shows the sequence of the actuations of the elements shown in FIG. 17.
Figure 17:
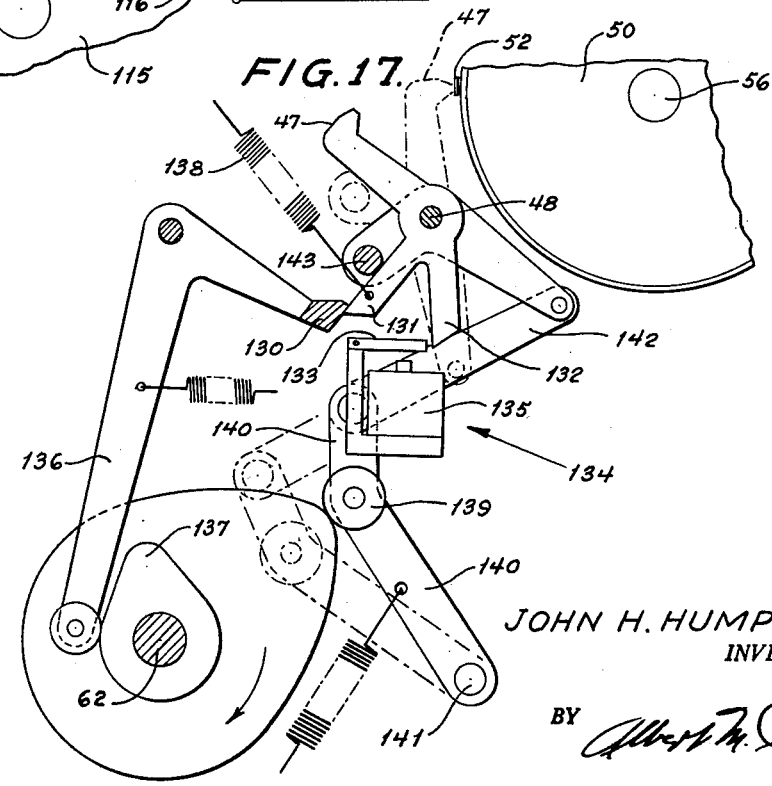
FIG. 17 is a cross sectional view taken through a portion of the recording machine which employs an alternate sytem for controlling and actuating the printing hammers.

The mechanism which prints dots (or dashes) on record sheet 51 has been described as a sequence of operations wherein a plurality of solenoids have been actuated by electrical power to force hammers 47 against a ribbon 52 and print a sequence of small dots on record sheet 51. The mechanism described is the preferred mechanism but the actuation of the hammers may be accomplished in another manner as shown in FIG. 17. A timing diagram for this structure is shown in FIG. 16. In the alternate arrangement shown in FIG. 17 the printing hammers 47 are normally restrained in their nonoperating position by a bail 130 which extends for the entire width of the machine and retains hammers 47 in their nonactuated position by engaging an auxiliary arm 131. Hammers 47 are provided with a second arm 132, designed to be blocked or released by the armatures 133 of magnets 134 having windings 135 which are controlled by switch 121 in the timing mechanism. Hammers 47 are released for impact against printing ribbon 52 by means of an arm 136 and an operating cam 137 secured to shaft 62. When arm 136 is rotated clockwise, bail 130 is withdrawn from contact with arms 131 and hammers 47 are thereby either retained by armatures 133 engaging arms 132, or are permitted to strike against ribbon 52 under the resilient urging of a hammer spring 138.

After the actuation of the hammers 47, shaft 62 continues its revolution and forces a cam follower 139 into the position shown in FIG. 17, thereby rotating arm 140 about pivot 141 and moving a rod 142 to rotate a bail 143 from the position shown in dotted lines to the position shown in full lines, thereby cocking all the hammers 47 in the position shown in the figure. This alternate method of firing the printing hammers requires a sturdy drum 50 but reduces the time of printing and insures that the printing operation is not dependent upon a number of relay contacts. Shaft 62 is shown rotated about one-half a revolution from its starting position.

The timing diagram shown in FIG. 16 illustrates the sequence of operations. The magnet armatures are actuated by a closed circuit through contacts 121 in the time clock circuit and contacts 31 in the tag rack and are lowered first as indicated by line 146. The one-revolution clutch which turns shaft 62 is started about the same time. A short time later cam 137 lifts arm 136 and the hammers are released. This action is indicated by line 147 on the diagram. The print hammers 47 strike the ribbon and paper as soon as released (line 148) and in about twenty degrees movement of shaft 62, bail 143 starts to move the released hammers back to their latched position (line 150).

The above description has included a ribbon 52 for producing a spot on the record sheet. For wide record sheets such a ribbon is hard to keep in its printing position and other methods of making a mark on the record sheet may be used. One such method includes a chemically prepared record sheet which shows a mark when in contact with the metal hammer head. Still another method includes a self-inking device such as used in present day numbering machines. Other embodiments of the invention may be used and identifying tags of various shapes and sizes may be employed without departing from the field of the invention which should be limited only by the scope of the appended claims.

I claim:

1. An attendance recording system for recording the presence of individuals within a work area and for identifying them therein comprising, a plurality of identification tags, each containing information which identifies an individual, a rack having a plurality of compartments, each compartment identified with a specific tag, and each compartment including a pair of electrical contacts which are closed when a tag is withdrawn from its compartment, a recorder which includes a rotatable frame, a plurality of moving cylinders mounted for rotation on said frame, each of said cylinders having a record sheet mounted thereon and a motor coupled to said cylinders for rotating the same by an amount proportional to the elapsed time, mechanical devices for sequentially positioning each of said cylinders in a recording position, a plurality of printing hammers, one for each pair of contacts, positioned for contacting the recording sheet carried by the one of said cylinders and resiliently stressed for movement to engage said record sheet thereon in such recording position, first mechanical means including a cam operated bail and first latch means carried by each of said hammers, said bail normally engaging said first latch means for holding said hammers out of contact with said sheet, second latch means carried by each of said hammers and a second mechanical means including an armature for releasably engaging said second latch means, solenoid means for actuating said armature, said solenoid means being included in a circuit comprising a pair of said electrical contacts and a time controlled switch, said cam operated bail being periodically operable by a shaft coupled to said motor for movement to free all of said first latch means and said armature being operable only in response to the closed position of a pair of said electrical contacts and of said time switch for freeing said one hammer associated with said pair of electrical contacts to enable said one hammer to print on said record sheet.

2. Attendance recording system as in claim 1, and including a first one revolution clutch, actuated by first electro-magnetic means in series with said time controlled switch, for rotating said frame and a second one revolution clutch operated by a second electro-magnetic means in series with switching means operated by said first one revolution clutch to turn said frame to bring the next of the cylinders mounted thereon into recording position.

References Cited in the file of this patent
UNITED STATES PATENTS

| | | |
|---|---|---|
| 298,341 | Blodgett | May 13, 1884 |
| 622,795 | Dean | Apr. 11, 1899 |
| 854,281 | Ericson | May 21, 1907 |
| 2,412,870 | Kavanagh | Dec. 10, 1946 |
| 2,517,316 | Holmes | Aug. 1, 1950 |
| 2,557,870 | Gruettner | June 19, 1951 |
| 2,660,507 | Cordell | Nov. 24, 1953 |

FOREIGN PATENTS

| | | |
|---|---|---|
| 188,760 | Great Britain | Nov. 15, 1922 |
| 72,410 | Denmark | Apr. 16, 1951 |